US006306986B1

(12) United States Patent
Teasley

(10) Patent No.: US 6,306,986 B1
(45) Date of Patent: Oct. 23, 2001

(54) POLYMERIZATION OF OLEFINS

(75) Inventor: Mark F Teasley, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/417,249

(22) Filed: Oct. 13, 1999

Related U.S. Application Data

(60) Provisional application No. 60/104,181, filed on Oct. 14, 1998.

(51) Int. Cl.[7] .................................. C08F 4/16; C08F 4/44
(52) U.S. Cl. ....................... 526/161; 526/172; 526/348.6; 526/352; 502/155
(58) Field of Search ..................... 526/172, 352, 526/348.6, 161

(56) References Cited

U.S. PATENT DOCUMENTS

| | | | |
|---|---|---|---|
| 5,714,556 | 2/1998 | Johnson et al. | 526/135 |
| 5,866,663 | 2/1999 | Brookhart et al. | 526/170 |
| 6,114,483 * | 9/2000 | Coughlin et al. | 526/172 |

FOREIGN PATENT DOCUMENTS

| | | | |
|---|---|---|---|
| WO 98/03617 | 1/1998 | (WO) | C10M/145/14 |
| WO 98/40374 | 9/1998 | (WO) | C07D/319/02 |

OTHER PUBLICATIONS

Volkov et al., Vysokomol. soyed. A15, 10, 2681–2687 (1973).*

L. A. Volkov, et al., Reactions of Limiting Polymer Chain Extension During Polymerization of Butu–1,3–Diene Under the Action of the $CoCl_2-(C_5H_5N)_3-Al(iso-C_4H_5)_2Cl-H_2O$ Catalytic System*, *Vysokomol. soyed. A15*, 10, 2366–2371, 1973.

L. A. Volkov, et al., Investigation of Activating Capacity of Alumoxane During Polymerization of 1,3–Butadiene in the Presence of $CoCl_2-(C_5H_5N)_2$, *Unknown*, Unknown, 455–457, Unknown (Translation Attached) Vysokomol. soyed., pp. 455–457, submitted for publication on Jun. 1971.

* cited by examiner

*Primary Examiner*—David W. Wu
*Assistant Examiner*—R. Harlan

(57) ABSTRACT

Certain alkylhaloaluminoxanes and other alkylhaloaluminum compounds, when used as cocatalysts for the polymerization of olefins with complexes of transition metals and neutral bidentate ligands give good yields of polyolefin when using less of the alkylhaloaluminoxane than other types of aluminum compounds.

18 Claims, No Drawings

POLYMERIZATION OF OLEFINS

This application claims priority under 35 U.S.C. §119 from U.S. Provisional Application Ser. No. 60/104,181 (filed Oct. 14, 1998), which is incorporated by reference herein as if fully set forth.

FIELD OF THE INVENTION

Olefins such as ethylene may be polymerized using polymerization catalysts containing transition metals complexed to neutral bidentate ligands and using as cocatalysts "alkylhaloaluminoxanes". These cocatalysts often give high polymer yields, even at relatively low ratios of aluminum containing cocatalyst to transition metal. Haloalkylaluminum compounds also give good yields of polyethylene at relatively low ratios of aluminum containing cocatalyst to transition metal.

TECHNICAL BACKGROUND

Recently it has been found that certain complexes of late transition metals, such as Ni, Pd, Fe, and others are effective catalysts for the polymerization of various olefins, such as ethylene, propylene, higher α-olefins, norbornenes, cyclopentenes, and others, and copolymers thereof. In some instances olefins containing polar groups such as esters may also be copolymerized. Descriptions of many of these polymerizations will be found in World Patent Application 96/23010, and U.S. Pat. No. 5,714,556.

While some of these complexes may by themselves be able to polymerize such olefins, more commonly a cocatalyst, particularly an alkylaluminum compound, is also added to the polymerization to form an active polymerization system. Typically these cocatalysts have been alkylaluminoxanes (especially methylaluminoxanes), dialkylaluminum chlorides, and trialkylaluminum compounds. Sometimes, and particularly with trialkylaluminum compounds a second cocatalyst, such as another Lewis acid, is also added. While alkylaluminum compounds are effective cocatalysts, they often suffer from one or more drawbacks, such as relatively low catalyst productivity and/or rates, poor catalyst stability, and/or the need for relatively high amounts of the alkylaluminum compound in order to obtain good polymerization rates and/or catalyst productivity. Therefore catalysts systems which are overall improved are desirable.

The use of various alkylaluminum compounds as cocatalysts for the polymerization of olefins using various early transition metal catalysts such as Ziegler-Natta-type catalysts and metallocene-type catalysts is well known. Among the alkylaluminum compounds which have been used for such cocatalysts have been alkylhaloaluminoxanes such as diethyldichloroaluminoxane.

L. A. Volkov, et al., Vysokomol. Soedin., Ser. B, vol. 15, p. 455–457 (1973) report the use of bis(ethylchloroaluminum)oxide as a cocatalyst (with other cocatalysts) for the polymerization of 1,3-butadiene using a $CoCl_2(pyridine)_2$ complex. The use of bidentate ligands is not mentioned.

Netherlands Patent Application 66/04717 reports the polymerization of butadiene using cobalt tris(acetylacetonate) and bis(ethylchloroaluminum)oxide as a cocatalyst. The use of neutral ligands is not mentioned.

U.S. Pat. Nos. 5,714,556 and 5,866,663 describe the use of various polymerization processes using various late transition metal complexes as catalysts, together with various alkyaluminum compounds as catalysts. The use of alkylhaloaluminoxanes is not specifically described, and the polymerization processes described herein with haloalkylaluminum compounds are also not specifically described.

SUMMARY OF THE INVENTION

This invention concerns a process for the polymerization of an olefin or olefins comprising the step of contacting, under polymerizing conditions:

(a) a transition metal polymerization catalyst wherein a metal of Groups 3 through 10 (new notation) is complexed to a neutral bidentate ligand, (b) an alkylaluminum cocatalyst, and (c) at least one olefin capable of being polymerized thereby, wherein the alkylaluminum cocatalyst comprises a compound of the formula $R^1_a X_b AlO_d$, wherein:

a and b are each independently about 0.50 to about 1.50, and d is 0.5 to 1.0, both provided that a+b+d is 2.0–2.5;

each $R^1$ is independently hydrocarbyl or substituted hydrocarbyl; and

X is carboxylate, fluoride, chloride, bromide or iodide.

This invention also concerns a process for the polymerization of olefins, and particularly ethylene, comprising the step of contacting, under polymerizing conditions:

(a) a transition metal polymerization catalyst wherein a metal of Groups 3 through 10 (new notation) is completed to a neutral bidentate ligand;

(b) an alkylaluminum cocatalyst; and (c) ethylene, wherein the alkylaluminum cocatalyst comprises a compound of the formula $R^{60}_q AlZ_t$, wherein:

q and t are each independently about 0.50 to about 2.50, provided that q+t is about 3.0;

each $R^{60}$ is independently hydrocarbyl or substituted hydrocarbyl; and

Z is fluoride, chloride, bromide or iodide;

and further provided that the molar ratio of aluminum in $R^{60}_q AlZ_t$ to the transition metal in said transition metal polymerization catalyst is 75 to 500.

In the aforementioned processes, the polymerization catalyst is preferably a V, Cr, a rare earth metal, Fe, Co, Ni or Pd complex of a ligand selected from the group consisting of:

(IV)

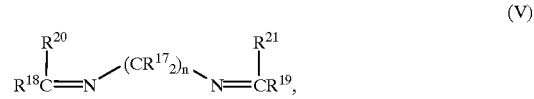

(V)

-continued

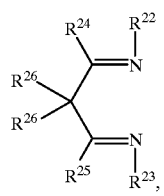
(VI)

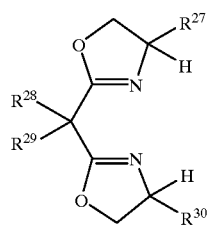
(VII)

Ar¹Q$_p$ (VIII);

R³¹R³²N—CR³³R³⁴(CR³⁵R³⁶)$_m$—NR³¹R³² (IX);

(X)

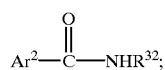
(XI)

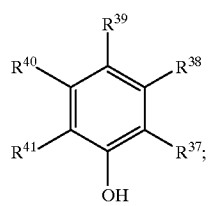
(XII)

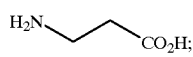
(XIII)

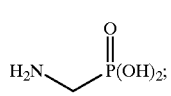
(XIV)

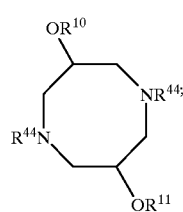
(XV)

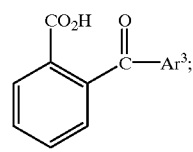
(XVI)

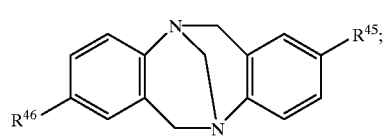

-continued

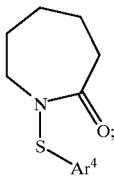
(XVII)

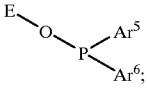
(XVIII)

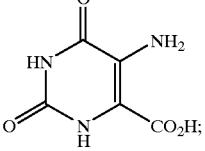
(XIX)

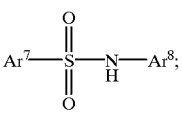
(XX)

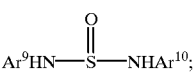
(XXI)

R⁴⁷R⁴⁸R⁴⁹P (XXII);

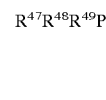
(XXIII)

and

R³¹S—CR³³R³⁴(CR³⁵R³⁶)$_m$—SR³¹ (XXIV);

wherein:
Ar¹ is an aromatic moiety with n free valencies, or diphenylmethyl;
each Q is —NR⁵²R⁵³ or —CR⁵⁴=NR⁵⁵;
p is 1 or 2;
E is 2-thienyl or 2-furyl;
each R⁵² is independently hydrogen, benzyl, substituted benzyl, phenyl or substituted phenyl;
each R⁵⁴ is independently hydrogen or hydrocarbyl; and
each R⁵⁵ is independently a monovalent aromatic moiety;
m is 1, 2 or 3;
R⁵³ is hydrogen or alkyl;
each R³³, R³⁴, R³⁵, and R³⁶ is independently hydrogen, hydrocarbyl or substituted hydrocarbyl;
each R³¹ is independently hydrocarbyl or substituted hydrocarbyl containing 2 or more carbon atoms;
each R³² is independently hydrogen, hydrocarbyl or substituted hydrocarbyl;
Ar² is an aryl moiety;
R³⁸, R³⁹, and R⁴⁰ are each independently hydrogen, hydrocarbyl, substituted hydrocarbyl or an inert functional group;

$R^{37}$ and $R^{41}$ are each independently hydrocarbyl, substituted hydrocarbyl or an inert functional group whose $E_s$ is about −0.4 or less;

$Ar^3$ is an aryl moiety;

$R^{45}$ and $R^{46}$ are each independently hydrogen or hydrocarbyl;

$Ar^4$ is an aryl moiety;

$Ar^5$ and $Ar^6$ are each independently hydrocarbyl;

$Ar^7$ and $Ar^8$ are each independently an aryl moiety;

$Ar^9$ and $Ar^{10}$ are each independently an aryl moiety or —$CO_2R^{56}$, wherein $R^{56}$ is alkyl containing 1 to 20 carbon atoms;

$Ar^{11}$ is an aryl moiety;

$R^{50}$ is hydrogen or hydrocarbyl;

$R^{51}$ is hydrocarbyl or —C(O)—$NR^{50}$—$Ar^{11}$;

$R^{44}$ is aryl;

$R^{47}$ and $R^{48}$ are each independently phenyl groups substituted by one or more alkoxy groups, each alkoxy group containing 1 to 20 carbon atoms;

$R^{49}$ is alkyl containing 1 to 20 carbon atoms, or an aryl moiety;

$R^{22}$ and $R^{23}$ are each independently phenyl groups substituted by one or more alkoxy groups, each alkoxy group containing 1 to 20 carbon atoms; and $R^{24}$ is alkyl containing 1 to 20 carbon atoms, or an aryl moiety;

each $R^{26}$ is hydrogen, hydrocarbyl, or substituted hydrocarbyl, provided that both of $R^{26}$ taken together may form a ring;

$R^{10}$ and $R^{11}$ are each independently hydrogen or acyl containing 1 to 20 carbon atoms;

$R^{13}$ and $R^{16}$ are each independently hydrocarbyl or substituted hydrocarbyl, provided that the carbon atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{27}$ and $R^{30}$ are independently hydrocarbyl or substituted hydrocarbyl;

$R^{28}$ and $R^{29}$ are each independently hydrogen, hydrocarbyl or substituted hydrocarbyl; and n is 2 or 3.

DETAILS OF THE PREFERRED EMBODIMENTS

In the polymerization processes and catalyst compositions described herein certain groups may be present. By hydrocarbyl is meant a univalent radical containing only carbon and hydrogen. By substituted hydrocarbyl herein is meant a hydrocarbyl group which contains one or more (types of) substituents that do not interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents are halo, ester, amino, imino, carboxyl, phosphite, phosphonite, phosphine, phosphinite, thioether, and amide. Which substitutents are useful in which polymerizations may in some cases be determined by reference to World Patent Application 96/23010 and U.S. Pat. No. 5,714,556. By (substituted) hydrocarbylene is meant a group analogous to hydrocarbyl, except the radical is divalent. By benzyl is meant the $C_6H_5CH_2$— radical, and substituted benzyl is a radical in which one or more of the hydrogen atoms is replaced by a substituent group (which may include hydrocarbyl). By an aryl moiety is meant a univalent group whose free valence is to a carbon atom of an aromatic ring. The aryl moiety may contain one or more aromatic ring and may be substituted by inert groups. By phenyl is meant the $C_6H_5$— radical, and a phenyl moiety or substituted phenyl is a radical in which one or more of the hydrogen atoms is replaced by a substituent group (which may include hydrocarbyl). Preferred substituents for substituted benzyl and phenyl include those listed above for substituted hydrocarbyl, plus hydrocarbyl. If not otherwise stated, hydrocarbyl, substituted hydrocarbyl and all other groups containing carbon atoms, such as alkyl, preferably contain 1 to 20 carbon atoms.

By an alkylaluminum compound is meant a compound which has at least one alkyl group bound to an aluminum atom.

For (IV) through (XXIV) preferred formulas and compounds (as ligands for polymerization catalysts) are found in World Patent Application 96/23010 and U.S. Pat. No. 5,714,556, both of which are hereby included by reference, and preferred grouping and compounds in these applications are also preferred herein. However the compound numbers and group (i.e., $R^x$) numbers in these documents may vary from those herein, but they are readily convertible. These documents also describe synthesis of the various ligands.

There are many different ways of preparing active polymerization catalysts of Ni, Pd or other transition metal coordination compounds (IV) through (XXIV), many of which are described in World Patent Application 96/23010 and U.S. Pat. No. 5,714,556, and those so described are applicable herein. "Pure" compounds which themselves may be active polymerization catalysts may be used, or the active polymerization catalyst may be prepared in situ by a variety of methods.

For instance, olefins, including ethylene, may be polymerized by contacting, at a temperature of about −100° C. to about +200° C. the cocatalyst (in formulas sometimes dubbed W herein), which is capable of abstracting either $Q^-$ or $S^-$ to form $WQ^-$ or $WS^-$, and a second compound of the formula (XXV)

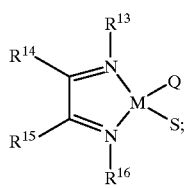

and one or more olefins wherein:

M is a transition metal such as Ni or Pd;

$R^{13}$ and $R^{16}$ are each independently hydrocarbyl or substituted hydrocarbyl, provided that the carbon atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a ring;

Q is alkyl, hydride, perfluorocarboxylate, chloride, iodide, or bromide; and

S is alkyl, carboxylate, perfluorocarboxylate, hydride, chloride, iodide, or bromide, or other anions.

Which late transition metal containing polymerization catalysts will polymerize which olefins will also be found in World Patent Application 96/23010 and U.S. Pat. No. 5,714,556. Preferred monomers are monolefins and nonconjugated diolefins. Monomers useful herein include ethylene, propylene, other α-olefins of the formula $R^{67}CH=CH_2$, wherein $R^{67}$ is n-alkyl containing 2 to about 20 carbon atoms, cyclopentene and norbornene. Preferred monomers are ethylene, propylene and cyclopentene, and ethylene is especially preferred. Olefins containing polar groups such as esters may also be used as comonomers with some of these polymerization catalysts.

Conditions for such polymerizations will also be found in World Patent Application 96/23010 and U.S. Pat. No. 5,714,556. Briefly and generally, the temperature at which the polymerization is carried out is about −100° C. to about +200° C., preferably about −20° C. to about +80° C. The polymerization pressure which is used with a gaseous olefin is not critical, atmospheric pressure to about 275 MPa, or more, being a suitable range. With a liquid monomer the monomer may be used neat or diluted with another liquid (solvent) for the monomer. These polymerizations may be batch, semi-batch or continuous processes, and may be carried out in liquid medium or the gas phase (assuming the monomers have the requisite volatility). These details will also be found in World Patent Application 96/23010 and U.S. Pat. No. 5,714,556. All the polymerizations may be run in the presence of a chain transfer agent, such as hydrogen or a silane, for example a silane of the formula $R^{70}{}_3SiH$ wherein each $R^{70}$ is hydrocarbyl or substituted hydrocarbyl, especially alkyl, for instance triethylsilane or trimethylsilane. Other alkylaluminum compounds may also be added, as additional cocatalysts and/or scavengers for impurities such as water.

In all these polymerization processes a preferred ligand is (IV). In all cases herein where (IV) appears, including as a ligand, it is preferred that $R^{13}$ and $R^{16}$ are each independently hydrocarbyl provided that the carbon atom bound to the imino nitrogen atom has at least two carbon atoms bound to it; and $R^{14}$ and $R^{15}$ are each independently hydrogen, hydrocarbyl, or $R^{14}$ and $R^{15}$ taken together are hydrocarbylene to form a ring. Some useful combinations and/or individual groupings for $R^{13}$, $R^{14}$, $R^{15}$ and $R^{16}$ are shown in Table I.

TABLE I

| $R^{13}$ | $R^{14}$ | $R^{15}$ | $R^{16}$ |
| --- | --- | --- | --- |
| 2,6-i-PrPh | Me | Me | 2,6-i-PrPh |
| 2,6-i-PrPh | H | H | 2,6-i-PrPh |
| 2,6-MePh | H | H | 2,6-MePh |
| 2,6-MePh | Me | Me | 2,6-MePh |
| 2,6-MePh | An | An | 2,6-MePh |
| 4-t-Bu-2,6-MePh | An | An | 4-t-Bu-2,6-MePh |

TABLE I-continued

| $R^{13}$ | $R^{14}$ | $R^{15}$ | $R^{16}$ |
| --- | --- | --- | --- |
| 2-Cl-4,6-MePh | An | An | 2-Cl-4,6-MePh |
| 2,6-Cl-4-MeOPh | An | An | 2,6-Cl-4-MeOPh |
| 2,4,6-MePh | Me | Me | 2,4,6-MePh |
| 2-CF$_3$-6-MePh | An | An | 2-CF$_3$-6-MePh |
| 2,6-i-PrPh | An | An | 2,6-i-PrPh |
| 2,6-EtPh | Me | Me | 2,6-EtPh |
| 2,6-EtPh | An | An | 2,6-EtPh |
| 2-t-BuPh | Me | Me | 2-t-BuPh |
| 1-Np | Me | Me | 1-Np |
| Ph$_2$CH | H | H | Ph$_2$CH |
| 2-PhPh | Me | Me | 2-PhPh |
| Ph | a | A | Ph |
| Ph | Me | Me | Ph |
| Ph | Ph | Ph | Ph |
| 2,4,6-MePh | An | An | 2,4,6-MePh |
| 2,4,6-MePh | Ph | Ph | 2,4,6-MePh |

ᵃ—CMe$_2$CH$_2$CMe$_2$—

In Table 1 and otherwise herein the following abbreviations are used: Me=methyl; Et=ethyl; Cl=chloro; Br=bromo; i-Pr=isopropyl; Ph=phenyl; t-Bu=t-butyl; and An=1,8-naphthylylene,

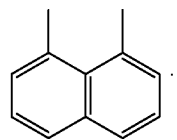

To indicate substitution on a phenyl ring, the nomenclature is abbreviated, the number of ring positions indicating how many of the substituents are on the ring. For instance, 4-Br-2,6-MePh indicates 4-bromo-2,6-dimethylphenyl.

In all transition metal compounds it is preferred that the transition metal is a group 5 to group 10 element, more preferably, Co, Fe, V, Cr, Ni or Pd, especially preferably Ni or Pd, and most preferably Ni.

One cocatalyst herein is an alkylaluminum compound, an alkylhaloaluminoxane, of the formula $R^1{}_aX_bAlO_d$, wherein $R^1$, X, a, b and d are as defined above. By an alkylaluminum compound is meant a compound in which an aluminum atom has at least one alkyl group bound to it. In $R^1{}_aX_bAlO_d$, it is preferred that $R^1$ is alkyl containing 1 to 20 carbon atoms, more preferably contains 1 to 4 carbon atoms, and/or preferably that X is fluoride, chloride, bromide, or iodide, more preferably chloride or bromide and especially preferably chloride, and/or that a and b are each independently about 0.75 to about 1.25, more preferably each about 1.0, and/or that d is about 0.5 to about 0.7, more preferably about 0.5. When X is carboxylate it is preferred that the conjugate acid of X have a pKa in water of <2. The desired cocatalysts can be made by methods known in the art, see for instance M. Boleslawski, et al., Przem. Chem., vol. 65, p. 141–143 (1986); V. D. Petrova, et al., Izv. Akad. Nauk SSSR, Ser. Khim. p. 1373–1379 (1978); and A. Storr, et al., J. Am. Chem. Soc., vol. 90, p. 3173–3177 (1968).

It will be understood that by the formula $R^1{}_aX_bAlO_d$, is meant a compound which has this average formula, or a material which is a mixture of compounds in which at least 10 mole percent, more preferably 25 mole percent, of the compounds present have this formula. It is understood by those skilled in the art that alkylaluminum compounds of the type used herein may be in dynamic equilibrium among many individual species. For instance, the compound wherein a and b are each 1 and d is 0.5 may be formally written as

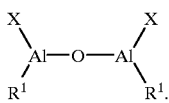
(XXVI)

However, the molecular formula could also be written as

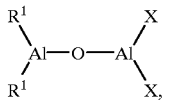
(XXVII)

which would also be a cocatalyst under the definition herein. In fact both of these species may exist in equilibirum with each other. Other more complex species, which are dimers, trimers, etc. may also be present, such as an oligomeric species with the formula

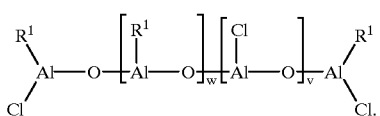
(XXVIII)

In (XXVIII) w and v each independently may be 0 [if both are zero (XXVIII) is equal to (XXVI)] or an integer. When w and/or v is large, the d approaches 1. However, a and b are still each 1.0 (if w and v are equal). Other variations of the formula will be apparent. Such oligomers need not be linear.

The "molar ratio" of the alkylhaloaluminoxane [moles meaning the total number of "gram-atoms" of Al present in the alkylhaloaluminoxane] to "gram-atoms" of transition metal present [it is understood that this refers to such metal atoms in the appropriate coordination compound(s)] is preferably about 1 or more, more preferably about 5 to about 2,000, especially preferably about 10 to about 1000, and very preferably about 25 to about 500. This ratio is often lower than is desirable than for other alkylaluminum compound cocatalysts in similar polymerizations.

Another useful cocatalyst described herein is an alkylhaloaluminum compound of the formula $R^{60}{}_{q}AlZ_{t}$. It is preferred that $R^{60}$ is alkyl, more preferably alkyl containing 1 to 4 carbon atoms. Preferred specific groups for $R^{60}$ are methyl, ethyl and isobutyl. It will be understood that, similarly to the aklylhaloaluminoxanes above, the alkylhaloaluminum compounds may exist as mixtures of various molecules which may equilibrate with one another. In preferred formulas, q is 1.5 and t is 1.5 (the aluminum alkyl sesquihalides), or q is 2 and t is 1, or q is 1 and t is 2. Preferred groups Z are chlorine and bromine, and chlorine is especially preferred. Many of these compounds are available commercially.

Using the alkylhaloaluminum compounds, the ratio of aluminum to transition metal compound(s) is 75 to 500, preferably about 90 to about 450, more preferably about 100 to about 400, and especially preferably about 150 to about 350. At these ratios use of alkylaluminum compound is minimized, while maintaining good productivity for the catalyst.

In some instances when the alkylhaloaluminoxanes and/or alkylhaloaluminum compounds are used as cocatalysts, polyolefins of lower molecular weight (higher melt index) are produced. This is advantageous when the lower molecular weights are desired, since chain transfer agents may not be needed or may be needed in lesser amounts. Some chain transfer agents may adversely affect the productivity of the transition metal catalysts used, so under some conditions this may also be a productivity advantage.

In all the polymerization processes herein the alkylaluminum compounds other an alkylhaloaluminoxane or alkylhaloaluminum compound may also be present, as for example for use as a scavenger. These compounds do not count in the aluminum to transition metal ratio.

In these polymerizations it may also be advantageous to add another cocatalyst, which is a neutral Lewis acid, or a cation(ic) Lewis acid. Such neutral Lewis acids are described in World Patent Application 96/23010 and U.S. Pat. No. 5,714,556. A useful Lewis acid is tris(pentafluorophenyl)boron. Cationic Lewis acids can include ionic compounds such as the tetrakis(pentafluorophenyl) borate anion salts with lithium, N,N-dimethylanilinium and triphenylcarbonium cations.

The polymerization processes herein may be run in the presence of various liquids, particularly aprotic organic liquids. The catalyst system, monomer(s), and polymer formed may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, isooctane, cyclohexane, propane, methylene chloride, toluene and benzene.

The polymerizations herein may also initially be carried out in the solid state by, for instance, supporting the transition metal compound on a substrate such as silica, alumina, a magnesium halide, sodium chloride, or an organic polymer, activating it with the alkylaluminum compound and exposing it to monomer(s). Another method of making a supported catalyst is to start a polymerization or at least make an transition metal complex of another olefin or oligomer of an olefin such as cyclopentene on a support such as silica or alumina. These "heterogeneous" catalysts may be used to catalyze polymerization in the gas phase or the liquid phase. By gas phase is meant that the ethylene is transported to contact with the catalyst particle while the ethylene is in the gas phase.

A preferred method of making a heterogeneous catalyst is to support the alkylhaloaluminoxane or alkylhaloaluminum compound on a solid such as silica or alumina particles. This may be done simply by exposing the particles to a solution of aluminum compound and then filtering, or simply evaporating the solvent. In many instances, such as with silica and alumina, the support often contains groups on the surface which may chemically react with the aluminum compound, thereby covalently binding the aluminoxane onto the support. Aluminum compounds which are so reacted and on such surfaces are included within the meaning of those aluminum compounds in the claims herein even though they formally may not have the indicated formula since they reacted with the support. The transition metal compound may then be added to the supported aluminum compound, and the combination simultaneously or later exposed to monomer(s) to begin the polymerization.

The combination of the transition metal catalyst compound mentioned above with a haloalkylaluminoxane or a haloalkylaluminum compound, particularly when they are both on a solid support, is a catalyst component which is a novel composition. Where applicable the ratio of aluminum compound to transition metal, as described above, is also applicable to these catalyst components. Preferred transition metal compounds and/or aluminum compounds, as described above, are also preferred in these catalyst components.

The polymers produced are useful in many applications depending on their properties. Such polyolefins may be used as lubricants, molding resins, for film, for fiber, and as foam. Other uses may be found in World Patent Application 96/23010 and U.S. Pat. No. 5,714,556.

In the Examples all pressures are gauge pressures, except for pressure less than 1 atmosphere, which are absolute pressures. Details of the calculation of methyl branches in the product polymers are found in World Patent Application 96/23010. When taking melting points by DSC, a heating rate of 10° C./min was used. Melting points reported are peak melting points on the second heat. The following abbreviations are used:

Et—ethyl iBu isobutyl

DSC—Differential Scanning Calorimetry

Me—methyl

MI—melt index

MMAO-3A—modified methylaluminoxane, type 3A

MMAO-7—modified methylaluminoxane, type 7

Mn—number average molecular weight

Mw—weight average molecular weight

PE—polyethylene

SMAO—silica-supported methylaluminoxane

Tm—melting point0

Materials

Condensed materials were handled in a nitrogen-purged glove box. Ethylene (Research Grade, 99.998%) was supplied by Matheson. Nitrogen (99.998%, MG Industries) was passed through an OxiSORB® HP purification column (MG). Isooctane (HPLC grade, Aldrich Chemical Co. Milwaukee, Wis., U.S.A.) was filtered through basic alumina (activity I) and stored over SMAO (0.25 g/L, Albermarle, 14.2% Al). Toluene and dichloromethane (anhydrous, Aldrich) were filtered through basic alumina (activity I). 1,3-Dichloro-1,3-dimethylaluminoxane [MeAlCl]$_2$O (0.50 M in toluene), 1,3-dichloro-1,3-diethyldialuminoxane, [EtAlCl]$_2$O (0.44M in toluene), and 1,3-dichloro-1,3-diisobutyldialuminoxane, [iBuAlCl]$_2$O (0.34M in toluene), were supplied by Aldrich. Modified methylaluminoxane-type 7, MMAO-7 (3.8 M Al in Isopar® E isoparaffin solvent from Exxon, Corp., with a boiling point range of 118–137° C., and a specific gravity of 0.722), and type 3A, MMAO-3A (1.7 M Al in heptane), were supplied by Akzo Nobel. Tris(pentafluorophenyl)boron, B(C$_6$F$_5$)$_3$, was supplied by Boulder Scientific. The following alkylaluminum chlorides were supplied by Aldrich: MeAlCl$_2$ (1.0 M in hexanes), Me$_3$Al$_2$Cl$_3$ (1.0 M in toluene), Me$_2$AlCl (1.0 M in hexanes), EtAlCl$_2$ (1.0 M in hexanes), Et$_3$Al$_2$Cl$_3$ (0.91 M in toluene), Et$_2$AlCl (1.0 M in hexanes), iBuAlCl$_2$ (neat). iBu$_2$AlCl (25 wt % in hexane) was supplied by Alfa Aesar. iBu$_3$Al$_2$Cl$_3$ (20 wt % in hexane) was supplied by Akzo Nobel.

The polymerizations were carried out using various nickel compounds. They were:

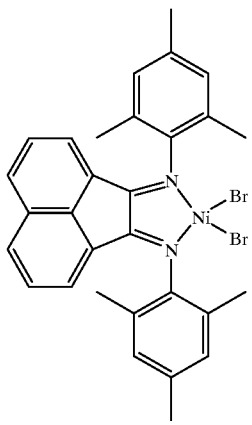

(XXIX)

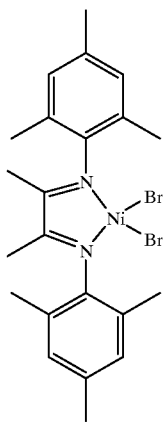

(XXX)

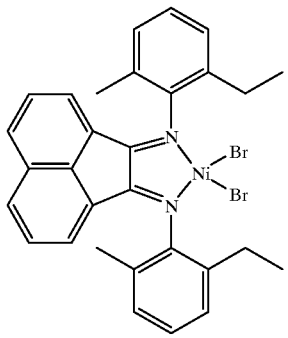

(XXXI)

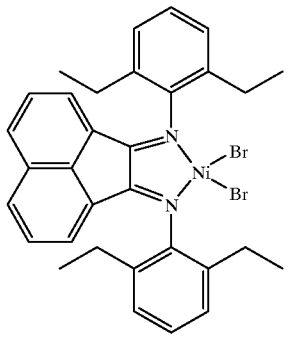

(XXXII)

-continued

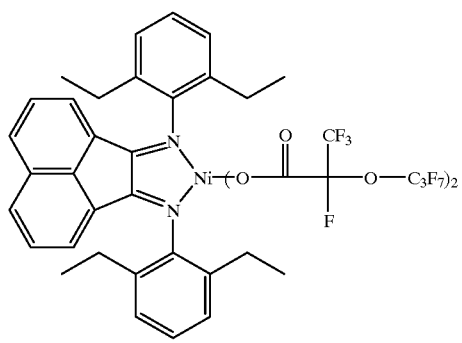

(XXXIII)

General Polymerization Procedure

A 600 mL pressure reactor equipped with a stirrer (1000 rpm) was used for the ethylene slurry polymerizations. The reactor was dried and purged at 130° C. by cycling between nitrogen (1.72 MPa) and vacuum (800 Pa) two times, then by pressurizing with nitrogen (1.72 MPa) and venting to atmosphere three times. The reactor was cooled to ambient temperature under nitrogen (1.72 MPa).

Isooctane (200 mL) and catalyst or cocatalyst solutions (10 mL) were charged to addition cylinders inside the glove box, connected to the reactor, and the charging lines were back purged using the reactor nitrogen pressure. The isooctane solution was charged to the reactor using ethylene pressure, cooled to 0° C., and saturated with ethylene (410–450 kPa). The catalyst solution was charged using ethylene or nitrogen (550 kPa) depending on whether the solution contained, respectively, late transition metal compound or late transition metal compound and cocatalyst(s).

After stirring at 0° C. for 5–15 min to initiate the polymerization, the reactor was heated rapidly to 60° C. as the pressure was increased to 1.03 MPa ethylene. The ethylene uptake was monitored by the pressure drop from a gas reservoir. The polymerization was terminated by venting the reactor pressure. The polyethylene was collected by vacuum filtration, washed with acetone, and dried at 70° C. in a nitrogen-purged vacuum oven.

EXAMPLES 1–20 AND COMPARATIVE EXAMPLES A–L TYPICAL PROCEDURE, METHOD A—EXAMPLE 1

This example demonstrates the in situ activation of (XXIX) in the polymerization reactor. [EtAlCl]$_2$O (0.385 mL, 0.16 mmol, 100 equivalents per Ni) was dissolved in the isooctane and charged to the reactor. (XXIX) (1.0 mg, 1.6 $\mu$mol) was dissolved in dichloromethane (10 mL) and charged to the reactor to initiate polymerization. After polymerization for 2 h at 60° C., the polyethylene was isolated to give 33.1 g (360 kg PE/g Ni). The melt index (190° C., 2160 g) was 7.2. The branch content was 30.9 CH$_3$/1000 CH$_2$ by $^1$H NMR (500 MHz, Cl$_2$CDCDCl$_2$, 120° C.). The peak melting temperature was 97° C. (101 J/g) by DSC on the second heating cycle.

Typical Procedure, Method B—Example 2

This example demonstrates the activation of a solution of (XXIX) and the use of cyclopentene as catalyst stabilizer until the catalyst solution is charged to the reactor. [EtAlCl]$_2$O (0.385 mL, 0.16 mmol, 100 equivalents per Ni) was dissolved in the isooctane and charged to the reactor. (XXIX) (1.0 mg, 1.6 $\mu$mol) was dissolved in toluene (10 mL) containing cyclopentene (25 $\mu$L, 0.284 mmol, 180 equivalents per Ni). The latter solution was activated by adding B(C$_6$F$_5$)$_3$ (4 mg, 0.0078 mmol, 5 equivalents per Ni) and [EtAlCl]$_2$O (18 $\mu$L, 0.0078 mmol, 5 equivalents per Ni), then charged to the reactor to initiate the polymerization. After polymerization for 2 h at 60° C., the polyethylene was isolated to give 30.0 g (330 kg PE/g Ni). The melt index (190° C., 2160 g) was 4.8. The branch content was 29.7 CH$_3$/1000 CH$_2$ by $^1$H NMR (500 MHz, Cl$_2$CDCDCl$_2$, 120° C.). The peak melting temperature was 119° C. (106 J/g) by DSC on the second heating cycle.

The results of the various polymerizations are shown in Tables 1–3.

TABLE 1

Polymerizations with (XIX) (1.6 $\mu$mol)

| Example | Method | Al Cocatalyst | Al/Ni | B Cocatalyst | B/Ni | Time hr | Yield g | Yield kg/g Ni | MI dg/min | Mw | Mw/Mn | Tm, peak ° C. (J/g) | Branching CH$_3$/1000 CH$_2$ |
|---|---|---|---|---|---|---|---|---|---|---|---|---|---|
| 1 | A | [EtAlCl]$_2$O | 200 | — | — | 2 | 33.1 | 360 | 7.2 | 60,200 | 2.68 | 97 (101) | 30.9 |
| 2 | B | [EtAlCl]$_2$O | 210 | B(C$_6$F$_5$)$_3$ | 5 | 2 | 30 | 330 | 4.8 | 87,000 | 3.87 | 119 (106) | 29.7 |
| 3 | A | [iBuAlCl]$_2$O | 200 | — | — | 2 | 41.8 | 450 | 7.8 | 52,800 | 2.48 | 92 (73) | 35.4 |
| 4 | B | [iBuAlCl]$_2$O | 210 | B(C$_6$F$_5$)$_3$ | 5 | 2 | 31.9 | 350 | 4.5 | 72,300 | 2.55 | 94,117 (94) | 26.6 |
| 5 | A | [iBuAlCl]$_2$O | 100 | — | — | 1 | 37.8 | 410 | 7.4 | 50,100 | 2.32 | 96 (68) | 32.2 |
| 6 | A | [MeAlCl]$_2$O | 100 | — | — | 1 | 32.4 | 350 | 5.9 | 68,000 | 2.86 | 93 (113) | 30.3 |
| 7 | A | [EtAlCl]$_2$O | 100 | — | — | 1 | 28.3 | 310 | 12.8 | 44,000 | 2.02 | 97 (116) | 31.9 |
| 8 | A | [iBuAlCl]$_2$O | 50 | — | — | 1 | 32.2 | 350 | 9.5 | 51,100 | 2.09 | 97 (76) | 31.6 |
| 9 | A | [MeAlCl]$_2$O | 50 | — | — | 1 | 22.2 | 240 | 2.8 | 61,300 | 2.27 | 99 (135) | 25.6 |
| A | A | [iBu$_2$Al]$_2$O | 200 | — | — | 0.5 | <1 | <10 | — | — | — | — | — |
| B | B | [iBu$_2$Al]$_2$O | 220 | B(C$_6$F$_5$)$_3$ | 5 | 2 | 28.2 | 310 | 10.2 | 49,400 | 2.4 | 98 (96) | 31.7 |
| C | A | Et$_2$AlOEt | 100 | — | — | 0.25 | 0 | 0 | — | — | — | — | — |
| D | B | Et$_2$AlOEt | 110 | B(C$_6$F$_5$)$_3$ | 5 | 2 | 13.1 | 140 | 6.4 | 51,700 | 2.86 | 91,122 (101) | 33.1 |
| E | A | iBu$_3$Al | 100 | — | — | 0.5 | 1.82 | 20 | NF | 227,000 | 3.38 | 126 (135) | 10 |
| F | B | iBu$_3$Al | 105 | B(C$_6$F$_5$)$_3$ | 5 | 0.5 | 6.67 | 72 | NF | 166,000 | 5.05 | 125 (111) | 22.4 |
| G | A | MMAO-7 | 100 | — | — | 1 | 7.52 | 81 | 0.03 | 149,000 | 2.56 | 126 (138) | 8.9 |
| H | A | MMAO-7 | 1000 | — | — | 2 | 33.4 | 361 | 0.1 | 96,500 | 2.63 | 122 (111) | 19 |

TABLE 2

Polymerizations with (XXIX) (0.3 μmol) using Method A

| Example | Al Cocatalyst | Al/Ni | Time hr | Yield g | Yield kg/g ni | MI dg/min | Mw | Mw/Mn | Tm, peak °C. (J/g) | Branching CH$_3$/1000 CH$_2$ |
|---|---|---|---|---|---|---|---|---|---|---|
| 10 | [iBuAlCl]$_2$O | 500 | 1 | 8.24 | 450 | 8 | 58,500 | 2.15 | 102 (100) | 27.2 |
| 11 | [iBuAlCl]$_2$O | 1000 | 2 | 10.5 | 570 | 5.5 | 65,400 | 2.4 | 98 (124) | 25.4 |
| 12 | [iBuAlCl]$_2$O | 6000 | 2 | 11.4 | 610 | 2.2 | 81,400 | 2.99 | 103 (133) | 21 |
| I | MMAO-7 | 500 | 1 | 2.34 | 130 | NF | 177,000 | 4.12 | 126 (138) | 6.8 |
| J | MMAO-7 | 1000 | 2 | 9.89 | 530 | 0.08 | 116,000 | 2.99 | 119 (130) | 15.3 |
| K | MMAO-7 | 6000 | 2 | 17.3 | 940 | 0.1 | 101,000 | 2.62 | 119 (115) | 16.2 |
| L | MMAO-3A | 1000 | 1 | 7.79 | 420 | 1.2 | 85,700 | 2.98 | 105 (155) | 20.9 |

TABLE 3

Polymerizations with (iBuAlCl)$_2$O using Method A

| Example | Ni Catalyst | Ni μmol | Al/Ni | Time hr | Yield g | Yield kg/g Ni | MI dg/min | Mw | Mw/Mn | Tm, peak °C. (J/g) | Branching CH$_3$/1000 CH$_2$ |
|---|---|---|---|---|---|---|---|---|---|---|---|
| 13 | (XXX) | 1.6 | 100 | 1 | 17.7 | 190 | 5 | 105,000 | 4.66 | 66 (93) | 48.5 |
| 14 | (XXXI) | 1.6 | 100 | 1 | 31.6 | 340 | 2.4 | 76,900 | 2.29 | 83 (103) | 45.1 |
| 15 | (XXIX) | 0.79 | 200 | 1 | 17.5 | 380 | 11 | 52,200 | 2.32 | 100 (112) | 27.7 |
| 16 | (XXXI) | 0.79 | 200 | 1 | 15.7 | 340 | 1.7 | 86,700 | 2.07 | 91 (85) | 33.7 |
| 17 | (XXXII) | 0.79 | 200 | 1 | 13 | 280 | 0.53 | 173,000 | 3.25 | 81 (67) | 42.5 |
| 18 | (XXXIII) | 0.79 | 200 | 1 | 12.2 | 270 | 0.5 | 173,000 | 2.59 | 75 (70) | 42 |
| 19 | (XXIX) | 0.79 | 200 | 1 | 21.1 | 460 | 12 | 47,600 | 2.34 | 102 (130) | 28.1 |
| 20 | (XXIX) | 0.79 | 100 | 1 | 19 | 410 | 11 | 52,100 | 2.31 | 101 (112) | 29 |

EXAMPLES 21–23

Typical Procedure, Method C—Example 21

These examples demonstrate the activation of the catalyst on a porous substrate treated with a chloroaluminoxane.

Porous silica particles were treated with a solution of excess [EtAlCl]$_2$O in toluene. The particles were filtered off, washed with toluene, and dried under vacuum. Analysis showed that the particles contained 3.28% Al. The particles were treated with a toluene solution of (XXIX) to give 0.012 mmol Ni/g (100 equiv. Al per Ni). The particles were filtered off, washed with toluene, and dried under vacuum. The supported catalyst (130 mg, 1.6 μmol Ni) was suspended in toluene (10 mL) and charged to the reactor at 0° C. to initiate the polymerization. After polymerization for 2 h at 60° C., the polyethylene was isolated.

Results of these 3 examples are given in Table 4.

EXAMPLES 24–37 AND COMPARATIVE EXAMPLES M AND N EXAMPLE 24

General Polymerization Procedure

A 600 mL pressure reactor equipped with a stirrer (1000 rpm) was used for the ethylene slurry polymerizations. The reactor was dried and purged at 130° C. by cycling between nitrogen (1.72 MPa) and vacuum (800 Pa absolute) two times, then by pressurizing with nitrogen (1.72 MPa) and venting to the atmosphere three times. The reactor was cooled to ambient temperature under nitrogen (1.72 MPa).

Et$_3$Al$_2$Cl$_3$ (0.0865 mL, 0.079 mmol, 100 equivalents Al per Ni) was dissolved in isooctane (200 mL). (XXIX) (1.0 mg, 1.6 μmol) was dissolved in the dichloromethane (10 mL). The solutions were charged to addition cylinders, connected to the reactor, and the charging lines were back purged using the reactor nitrogen pressure. The isooctane solution was charged to the reactor using ethylene pressure,

TABLE 4

Polymerizations Using (XXIX) and Method C

| Example | Ni μmol | Al Cocatalyst | Al/Ni | Time hr | Yield g | Yield kg | MI dg/min | Mw | Mw/Mn | Tm, peak °C. (J/g) | CH$_3$/1000 CH$_2$ |
|---|---|---|---|---|---|---|---|---|---|---|---|
| 21 | 1.6 | [EtAlCl]$_2$O | 100 | 2 | 14.2 | 150 | 0.16 | 128,000 | 3.25 | 125 (139) | 12.5 |
| 22 | 1.6 | [iBuAlCl]$_2$O | 100 | 1 | 13.6 | 150 | 0.07 | 123,000 | 3.08 | 125 (179) | 12.3 |
| 23 | 1.6 | [MeAlCl]$_2$O | 100 | 1 | 25.5 | 280 | 0.03 | 134,000 | 4.04 | 125 (179) | 12.9 | cooled to 0° C., and saturated with ethylene (410–450 kPa). The dichloromethane solution was charged to the reactor using ethylene pressure (550 kPa).

After stirring at 0° C. for 5 min to initiate the polymerization, the reactor was heated rapidly (about 3 min) to 60° C. as the pressure was increased to 1.03 MPa ethylene. The ethylene uptake was monitored by the pressure drop from a gas reservoir. The polymerization was terminated after 1 h by venting the reactor pressure. The polyethylene was collected by vacuum filtration, washed with acetone, and dried at 70° C. in a nitrogen-purged vacuum oven to give 35.1 g of polyethylene.

TABLE 5

Ethylene Polymerizations with (XXIX)

| Example | Ni μmol | Al Cocatalyst | Al/Ni | Yield g | Yield kg/g Ni | MI dg/min | Mw | Mw/Mn | Tm ° C. (J/g) | Branching CH$_3$/1000 CH$_2$ |
|---|---|---|---|---|---|---|---|---|---|---|
| 24 | 1.6 | Et$_3$Al$_2$Cl$_3$ | 100 | 35.1 | 380 | 17.6 | 50,700 | 2.43 | 91 (93) | 38 |
| 25 | 1.6 | EtAlCl$_2$ | 100 | 31.9 | 345 | 5 | 53,100 | 2.32 | 96 (112) | 37.2 |
| 26 | 1.6 | Et$_2$AlCl | 100 | 14 | 151 | 8 | 64,500 | 2.95 | 100 (121) | 27.6 |
| M$^b$ | 1.6 | MMAO-7 | 1000 | 33.4$^a$ | 361 | 0.1 | 96,453 | 2.63 | 122 (111) | 19 |
| N$^c$ | 1.6 | MMAO-7 | 100 | 7.52 | 81 | 0.03 | 148,600 | 2.56 | 126 (138) | 8.9 |
| 27 | 0.79 | Et$_3$Al$_2$Cl$_3$ | 200 | 20.5 | 443 | 11.3 | 47,100 | 2.79 | 100 (131) | 29.3 |
| 28 | 0.79 | Et$_3$Al$_2$Cl$_3$ | 100 | 11.9 | 257 | 10.8 | 50,600 | 1.88 | 101 (116) | 28.1 |
| 29 | 0.79 | EtAlCl$_2$ | 200 | 18.9 | 408 | 24 | 46,400 | 1.83 | 98 (102) | 31.6 |
| 30 | 0.79 | Me$_3$Al$_2$Cl$_3$ | 200 | 22.8 | 493 | 15.9 | 44,600 | 2.04 | 98 (114) | 30.2 |
| 31 | 0.79 | Me$_3$Al$_2$Cl$_3$ | 100 | 16.8 | 363 | 11.7 | 47,400 | 2.04 | 100 (105) | 28.8 |
| 32 | 0.79 | MeAlCl$_2$ | 200 | 19.9 | 431 | 14 | 50,300 | 1.95 | 98 (108) | 30.3 |
| 33 | 0.79 | Me$_2$AlCl | 200 | 4.14 | 90 | 1.8 | 84,600 | 6.1 | 123 (160) | 17.6 |
| 34 | 0.79 | iBu$_3$Al$_2$Cl$_3$ | 200 | 21.7 | 469 | 7.6 | 66,100 | 2.49 | 99 (102) | 29.3 |
| 35 | 0.79 | iBuAlCl$_2$ | 200 | 14.4 | 312 | 11.5 | 60,100 | 2.46 | 98 (81) | 32.1 |
| 35 | 0.79 | iBu$_2$AlCl | 200 | 20.9 | 452 | 3.6 | 63,200 | 2.66 | 97 (81) | 27.7 |
| 37 | 0.79 | iBu$_2$AlCl | 100 | 6.97 | 151 | 7.1 | 70,200 | 2.39 | 98 (101) | 25.1 |

$^a$2 h polymerization.
$^b$Same as Comparative Example H.
$^c$Same as Comparative Example G.

What is claimed is:

1. A process for the polymerization of an olefin or olefins comprising the step of contacting, under polymerizing conditions:

(a) a transition metal polymerization catalyst wherein a metal of Groups 3 through 10 is complexed to a neutral bidentate ligand, (b) an alkylaluminum cocatalyst, and (c) at least one monoolefin or nonconjugated diolefin capable of being polymerized thereby, wherein the alkylaluminum cocatalyst comprises a compound of the formula R$^1{}_a$X$_b$AlO$_d$, wherein:

a and b are each independently about 0.50 to about 1.50, and d is 0.5 to 1.0, both provided that a+b+d is 2.0–2.5;

each R$^1$ is independently hydrocarbyl or substituted hydrocarbyl; and

X is carboxylate, fluoride, chloride, bromide or iodide.

2. The process as recited in claim 1, wherein said olefin is ethylene.

3. The process as recited in claim 1, wherein said olefin is cyclopentene.

4. The process as recited in claim 1, wherein R is alkyl containing 1 to 4 carbon atoms and X is chlorine.

5. The process as recited in claim 1, wherein the molar ratio of aluminum to transition metal is about 25 to about 500.

6. The process as recited in claim 1, wherein said polymerization catalyst and/or said alkylaluminum cocatalyst are on a solid support.

7. The process as recited in claim 1, wherein the transition metal is a metal of Groups 5 to 10.

8. The process as recited in claim 1, wherein the transition metal polymerization catalyst is a V, Cr, a rare earth metal, Fe, Co, Ni or Pd complex of a ligand selected from the group consisting of:

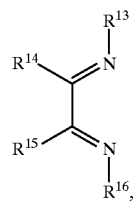
(IV)

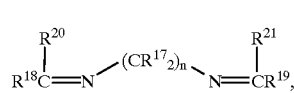
(V)

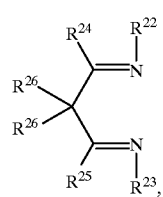
(VI)

-continued

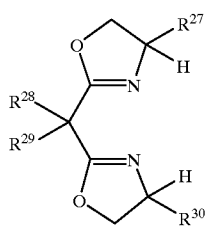 (VII)

Ar¹Q$_p$; (VIII)

R³¹R³²N—CR³³R³⁴(CR³⁵R³⁶)$_m$—NR³¹R³² (IX)

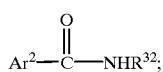 (X)

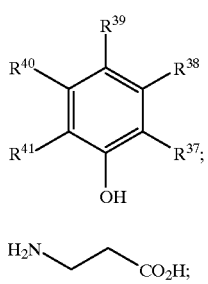 (XI)

H$_2$N—CH$_2$CH$_2$—CO$_2$H; (XII)

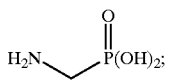 (XIII)

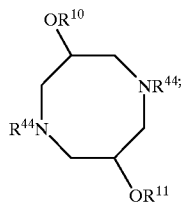 (XIV)

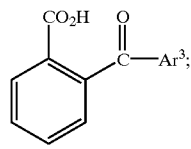 (XV)

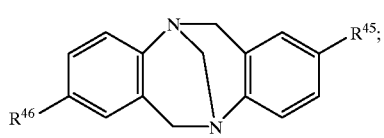 (XVI)

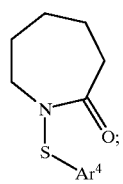 (XVII)

-continued

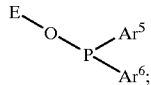 (XVIII)

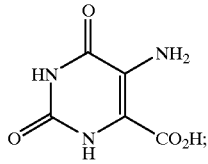 (XIX)

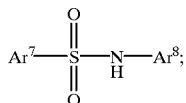 (XX)

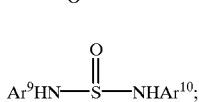 (XXI)

R⁴⁷R⁴⁸R⁴⁹P (XXII)

 (XXIII)

and

R³¹S—CR³³R³⁴ (CR³⁵R³⁶)$_m$—SR³¹ (XXIV);

wherein:

Ar¹ is an aromatic moiety with n free valencies, or diphenylmethyl;

each Q is —NR⁵²R⁵³ or —CR⁵⁴=NR⁵⁵;

p is 1 or 2;

E is 2-thienyl or 2-furyl;

each R⁵² is independently hydrogen, benzyl, substituted benzyl, phenyl or substituted phenyl;

each R⁵⁴ is independently hydrogen or hydrocarbyl; and each R⁵⁵ is independently a monovalent aromatic moiety;

m is 1, 2 or 3;

R⁵³ is hydrogen or alkyl;

each R³³, R³⁴, R³⁵, and R³⁶ is independently hydrogen, hydrocarbyl or substituted hydrocarbyl;

each R³¹ is independently hydrocarbyl or substituted hydrocarbyl containing 2 or more carbon atoms;

each R³² is independently hydrogen, hydrocarbyl or substituted hydrocarbyl;

Ar² is an aryl moiety;

R³⁸, R³⁹, and R⁴⁰ are each independently hydrogen, hydrocarbyl, substituted hydrocarbyl or an inert functional group;

R³⁷ and R⁴¹ are each independently hydrocarbyl, substituted hydrocarbyl or an inert functional group whose Es is about −0.4 or less;

Ar³ is an aryl moiety;

R⁴⁵ and R⁴⁶ are each independently hydrogen or hydrocarbyl;

Ar⁴ is an aryl moiety;

Ar⁵ and Ar⁶ are each independently hydrocarbyl;

Ar⁷ and Ar⁸ are each independently an aryl moiety;

Ar⁹ and Ar¹⁰ are each independently an aryl moiety or —CO$_2$R $^{56}$, wherein R$^{56}$ is alkyl containing 1 to 20 carbon atoms;

Ar¹¹ is an aryl moiety;

R$^{50}$ is hydrogen or hydrocarbyl;

R$^{51}$ is hydrocarbyl or —C(O)—NR$^{50}$—Ar¹¹;

R$^{44}$ is aryl;

R$^{47}$ and R$^{48}$ are each independently phenyl groups substituted by one or more alkoxy groups, each alkoxy group containing 1 to 20 carbon atoms;

R$^{49}$ is alkyl containing 1 to 20 carbon atoms, or an aryl moiety;

R$^{22}$ and R$^{23}$ are each independently phenyl groups substituted by one or more alkoxy groups, each alkoxy group containing 1 to 20 carbon atoms; and R$^{24}$ is alkyl containing 1 to 20 carbon atoms, or an aryl moiety;

each R$^{26}$ is hydrogen, hydrocarbyl, or substituted hydrocarbyl, provided that both of R $^{26}$ taken together may form a ring;

R$^{10}$ and R$^{11}$ are each independently hydrogen or acyl containing 1 to 20 carbon atoms;

R$^{13}$ and R$^{16}$ are each independently hydrocarbyl or substituted hydrocarbyl, provided that the carbon atom bound to the imino nitrogen atom has at least two carbon atoms bound to it;

R$^{14}$ and R$^{15}$ are each independently hydrogen, hydrocarbyl, substituted hydrocarbyl, or R$^{14}$ and R$^{15}$ taken together are hydrocarbylene substituted hydrocarbylene to form a carbocyclic ring;

R$^{18}$ is hydrocarbyl or substituted hydrocarbyl, and R$^{20}$ is hydrogen, hydrocarbyl or substituted hydrocarbyl or R$^{18}$ and R$^{20}$ taken together form a ring;

R$^{19}$ is hydrocarbyl or substituted hydrocarbyl, and R$^{21}$ is hydrogen, substituted hydrocarbyl or hydrocarbyl, or R$^{19}$ and R$^{21}$ taken together form a ring;

each R$^{17}$ is independently hydrogen, substituted hydrocarbyl or hydrocarbyl, or two of R$^{17}$ taken together form a ring;

R$^{27}$ and R$^{30}$ are independently hydrocarbyl or substituted hydrocarbyl;

R$^{28}$ and R$^{29}$ are each independently hydrogen, hydrocarbyl or substituted hydrocarbyl; and n is 2 or 3.

9. The process as recited in claim 8, wherein said ligand is (IV).

10. The process as recited in claim 9, wherein said transition metal is nickel; R$^{13}$ and R$^{16}$ are each independently hydrocarbyl provided that the carbon atom bound to the imino nitrogen atom has at least two carbon atoms bound to it; and R$^{14}$ and R$^{15}$ are each independently hydrogen or hydrocarbyl, or R$^{14}$ and R$^{15}$ taken together are hydrocarbylene to form a ring.

11. A process for the polymerization of ethylene comprising the step of contacting, under polymerizing conditions:
  (a) a transition metal polymerization catalyst wherein a metal of Groups 3 through 10 is complexed to a neutral bidentate ligand;
  (b) an alkylaluminum cocatalyst; and
  (c) ethylene, wherein the alkylaluminum cocatalyst comprises a compound of the formula R$^{60}_q$AlZ$_t$, wherein:

q and t are each independently about 0.50 to about 2.50, provided that q+t is about 3.0;

each R$^{60}$ is independently hydrocarbyl or substituted hydrocarbyl; and

Z is fluoride, chloride, bromide or iodide; and further provided that the molar ratio of aluminum in R$^{60}_q$AlZ$_t$ to the transition metal in said transition metal polymerization catalyst is 75 to 500.

12. The process as recited in claim 11, wherein R$^{60}$ is alkyl containing 1 to 4 carbon atoms, and X is chlorine.

13. The process as recited in claim 11, wherein q is 1.5 and t is 1.5, or q is 2 and t is 1, or q is 1 and t is 2.

14. The process as recited in claim 11, wherein said polymerization catalyst and/or said alkylaluminum cocatalyst are on a solid support.

15. The process as recited in claim 11, wherein the transition metal is a metal of Groups 5 to 10.

16. The process as recited in claim 11, wherein the transition metal polymerization catalyst is a V, Cr, a rare earth metal, Fe, Co, Ni or Pd complex of a ligand selected from the group consisting of:

(IV)

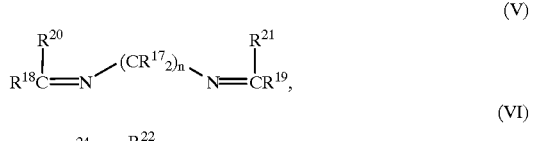

(V)

(VI)

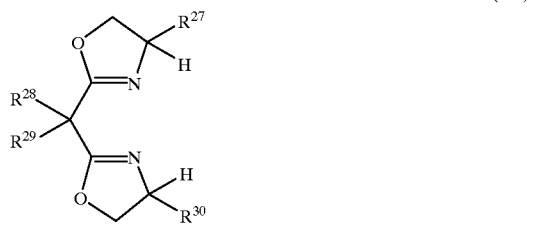

(VII)

(VIII);

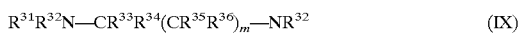

(IX)

(X)

-continued (XI)

(XII)

(XIII)

(XIV)

(XV)

(XVI)

(XVII)

(XVIII)

(XIX)

(XX)

-continued (XXI)

$$Ar^9HN-\underset{\underset{O}{\|}}{S}-NHAr^{10};$$

(XXII)

$$R^{47}R^{48}R^{49}P$$

(XXIII)

and $$R^{31}S-CR^{33}R^{34}(CR^{35}R^{36})_m-SR^{31} \quad (XXIV);$$

wherein:

$Ar^1$ is an aromatic moiety with n free valencies, or diphenylmethyl;

each Q is $-NR^{52}R^{53}$ or $-CR^{54}=NR^{55}$;

p is 1 or 2;

E is 2-thienyl or 2-furyl;

each $R^{52}$ is independently hydrogen, benzyl, substituted benzyl, phenyl or substituted phenyl;

each $R^{54}$ is independently hydrogen or hydrocarbyl; and each $R^{55}$ is independently a monovalent aromatic moiety;

m is 1, 2 or 3;

$R^{53}$ is hydrogen or alkyl;

each $R^{33}$, $R^{34}$, $R^{35}$, and $R^{36}$ is independently hydrogen, hydrocarbyl or substituted hydrocarbyl;

each $R^{31}$ is independently hydrocarbyl or substituted hydrocarbyl containing 2 or more carbon atoms;

each $R^{32}$ is independently hydrogen, hydrocarbyl or substituted hydrocarbyl;

$Ar^2$ is an aryl moiety;

$R^{38}$, $R^{39}$, and $R^{40}$ are each independently hydrogen, hydrocarbyl, substituted hydrocarbyl or an inert functional group;

$R^{37}$ and $R^{41}$ are each independently hydrocarbyl, substituted hydrocarbyl or an inert functional group whose Es is about −0.4 or less;

$Ar^3$ is an aryl moiety;

$R^{45}$ and $R^{46}$ are each independently hydrogen or hydrocarbyl;

$Ar^4$ is an aryl moiety;

$Ar^5$ and $Ar^6$ are each independently hydrocarbyl;

$Ar^7$ and $Ar^8$ are each independently an aryl moiety;

$Ar^9$ and $Ar^{10}$ are each independently an aryl moiety or $-CO_2R^{56}$, wherein $R^{56}$ is alkyl containing 1 to 20 carbon atoms;

$Ar^{11}$ is an aryl moiety;

$R^{50}$ is hydrogen or hydrocarbyl;

$R^{51}$ is hydrocarbyl or $-C(O)-NR^{50}-Ar^{11}$;

$R^{44}$ is aryl;

$R^{47}$ and $R^{48}$ are each independently phenyl groups substituted by one or more alkoxy groups, each alkoxy group containing 1 to 20 carbon atoms;

$R^{49}$ is alkyl containing 1 to 20 carbon atoms, or an aryl moiety;

$R^{22}$ and $R^{23}$ are each independently phenyl groups substituted by one or more alkoxy groups, each alkoxy group containing 1 to 20 carbon atoms; and $R^{24}$ is alkyl containing 1 to 20 carbon atoms, or an aryl moiety;

each $R^{26}$ is hydrogen, hydrocarbyl, or substituted hydrocarbyl, provided that both of $R^{26}$ taken together may form a ring;

$R^{10}$ and $R^{11}$ are each independently hydrogen or acyl containing 1 to 20 carbon atoms;

$R^{13}$ and $R^{16}$ are each independently hydrocarbyl or substituted hydrocarbyl, provided that the carbon atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{27}$ and $R^{30}$ are independently hydrocarbyl or substituted hydrocarbyl;

$R^{28}$ and $R^{29}$ are each independently hydrogen, hydrocarbyl or substituted hydrocarbyl; and n is 2 or 3.

17. The process as recited in claim 16, wherein said ligand is (IV).

18. The process as recited in claim 17, wherein said transition metal is nickel; $R^{13}$ and $R^{16}$ are each independently hydrocarbyl provided that the carbon atom bound to the imino nitrogen atom has at least two carbon atoms bound to it; and $R^{14}$ and $R^{15}$ are each independently hydrogen or hydrocarbyl, or $R^{14}$ and $R^{15}$ taken together are hydrocarbylene to form a ring.

* * * * *